United States Patent [19]
Steinberg et al.

[11] Patent Number: 6,000,030
[45] Date of Patent: Dec. 7, 1999

[54] SOFTWARE FINGERPRINTING AND BRANDING

[75] Inventors: Henry L. Steinberg, Westboro; Scott B. Gordon, Upton, both of Mass.

[73] Assignee: EMC Corporation, Hopkinton, Mass.

[21] Appl. No.: 08/667,337

[22] Filed: Jun. 20, 1996

[51] Int. Cl.[6] ............................................... H04L 9/00
[52] U.S. Cl. ........................... 713/200; 380/4; 380/23; 380/25
[58] Field of Search .............................. 364/200, 479.07; 380/4, 23, 25; 395/186, 187.01, 188.01; 707/9; 711/151, 152, 163, 164; 713/200, 201, 202

[56] References Cited

U.S. PATENT DOCUMENTS

| | | | |
|---|---|---|---|
| 4,135,240 | 1/1979 | Ritche | 364/200 |
| 4,646,234 | 2/1987 | Tolman et al. | 364/200 |
| 4,652,990 | 3/1987 | Pailen et al. | 364/200 |
| 4,688,169 | 8/1987 | Joshi | 364/200 |
| 4,864,494 | 9/1989 | Kobus, Jr. | 364/200 |
| 4,864,616 | 9/1989 | Pond et al. | 380/25 |
| 5,210,795 | 5/1993 | Lipner et al. | 380/23 |
| 5,241,594 | 8/1993 | Kung | 380/4 |
| 5,416,840 | 5/1995 | Cane et al. | 380/4 |
| 5,563,946 | 10/1996 | Cooper et al. | 380/4 |

FOREIGN PATENT DOCUMENTS

| | | |
|---|---|---|
| 0678836A1 | 4/1994 | European Pat. Off. . |
| 0706118A1 | 4/1995 | European Pat. Off. . |
| WO9608756 | 9/1994 | WIPO . |

OTHER PUBLICATIONS

Spender, "Technologial . . . PC", Dateline, Mar. 1985.
Fischer–Innis, "Watchdog . . . unleashed", Dateline, Aug. 23, 1985.
David Hammond, "Security . . . Option", Dateline, Feb. 26, 1996.
Rob Stuart et al., "How to stop . . . occurs", EMAP, Oct. 1989.

Primary Examiner—William Grant
Assistant Examiner—Steven R. Gorland
Attorney, Agent, or Firm—Fish & Richardson P.C.

[57] ABSTRACT

A method and apparatus for controlling the distribution of computer software products stored at a file server provide for requesting the identity of the user and the user's secret key prior to enabling access to a requested program product. The program product, upon proper verification of the user identify, is encoded using a second key which is known to the user, and preferably an identification of the user is embedded in the encoding program. Various methods are employed for tracking user access to particular programs, including storing the identify of the user either camouflaged in a commonly found program in non-volatile memory or hidden in a typically overlooked portion of non-volatile memory. In addition, the encoded program can have embedded therein one, and preferably two identifications of the user which can be used to track the program as well as to ensure that the program, when executed has not been tampered with. Upon execution of the encoded program by the user's system, the code is executed "on the fly" and no executable copy of the code is stored in non-volatile memory at any time. In the event that decoding does not result in a properly executable program, the system may need to be rebooted and/or the program may be at least partially destroyed.

24 Claims, 3 Drawing Sheets

SOFTWARE FINGERPRINTING AND BRANDING

BACKGROUND OF THE INVENTION

The invention relates to a method and apparatus for restricting the use of computer software to a known group of users; and, more particularly, to a method and apparatus for controlling the distribution of software products in Intranet or Internet environments.

As Intranet and Internet environments proliferate, a company's software becomes more subject to access by unauthorized individuals. It is therefore important to secure the software against unauthorized access, while, at the same time, enabling both the tracking of software use and the prevention of its unauthorized use.

The newspapers are replete with reports, lately, of "hackers" being able to penetrate, and acquire information and programs from, so-called secure systems. This information and program data may be the life blood of a company, and its unauthorized access by individuals, some of whom may be employees of the company itself, can cause severe damage to the reputation of the company and its financial health and viability. Companies often use, therefore, single, double, and more complex password security systems to prevent access to their systems by unauthorized users, but in addition must also be concerned about an authorized user, not having permission to use a particular software, who will still have access to the system.

Further, it is not common for the software programs themselves to be stored in an encoded manner nor is it common, once the individual has "broken in" to the system, to prevent access to much if not all of the data available to a typical user. It is therefore, important to protect to as high a degree as possible the software programs stored in systems which are accessible by more than one authorized user, and to enable tracking of the users accessing software using methodologies which are neither obvious nor easily detected.

SUMMARY OF THE INVENTION

The invention relates to a method of controlling the distribution of computer software products stored at a file server. The method features the steps of requesting the identity of a user and that user's secret key before enabling access by the user of requested program products. The requested program product is encoded, if the user identity and secret key match corresponding entries in a file server database, the program products being encoded using a second key which is known to the user (and which will be used by the user in decoding and executing the program). Also included in the encoded program is at least one embedded identification of the user.

In different aspects of the method of the invention, there are featured the steps of storing at the file server, and within a camouflaged program on a disk memory and/or a nonvolatile, non-disk memory, an identification of the user accessing the requested program for later use, if necessary, in tracking the users with who accessed the program. The method further features embedding at least two identifications of the user in the encoded program, at least one of the identifications being difficult to find and at least one of the identifications being easy to find. Preferably, the identifications are used in constructing a check code, such as a CRC code, to ensure that "hacking" or other debug processes have not been employed to modify the identification of the user. The encoded program can then be decoded by the user, using the second key which the user has available. The decoded program is executed, preferably on the fly, and is performed so that no copy of the executable program exists in non-volatile memory. If the correct second key is not provided, steps are taken to execute the improperly decoded program in a program destruct fashion wherein at least portions of the encoded program are rendered permanently unexecutable. In addition, the computer system attempting to execute the improperly decoded program can be disabled thereby requiring the system to be rebooted.

The method further features making the encoding dependent upon a third key which is derived from the address on, for example, hard disk at which the encoded program is stored. Thus, if the encoded program is moved from its original location, for example by copying onto floppy disk and then recopying into a new computer system, the program will not correctly decode and can effect destruction of at least portions of the program or the operating system of the computer.

In another aspect, the method relates to controlling the distribution of computer software products stored at a file server and delivered, upon a user request, over a network (such as the Intranet, Internet, . . . ). The method features the steps of receiving a request from a user to deliver a computer program over the network; requesting the identity of the user and the user's secret key before enabling access to the requested computer program; verifying the identity of the user; using the user's secret key, encoding the requested program, including embedding in the encoded program at least one identification of the user, and using at least an encoding key known to the user; and delivering the encoded program over the network to the user.

The apparatus of the invention relates to controlling the distribution of computer software products stored at a file server and features circuitry for requesting the identity of a user and the user's secret key to enable access to a requested program, circuitry for encoding the requested program if the user identify and the supplied secret code correspond to entries stored in a file server, the encoding being effected using a second key known to the user, and circuitry for embedding in the encoding program an identification of the user.

In other embodiments of the invention, the apparatus provides for controlling the unauthorized removal of software from a non-volatile storage medium and features circuitry for storing an encoded version of the requested software in the user's medium at an address used for deriving an encoding key. The encoding key is used to encode and decode the software. The invention further features circuitry for decoding the encoded software using a decoding key based upon the location of the encoded software at the user's storage medium.

In a preferred embodiment of the apparatus, circuitry is provided for storing at least two user identifications in the encoded program, and for using those identifications in a error check, for example a CRC check. In yet another embodiment of the apparatus, the server stores, in a non-volatile memory, an identification of the last user or users accessing a particular program.

BRIEF DESCRIPTION OF THE DRAWING

Other features and advantages of the invention will be apparent from the following description taken together with the drawings, in which.

DESCRIPTION OF THE PREFERRED EMBODIMENTS

Figures 1, 2:
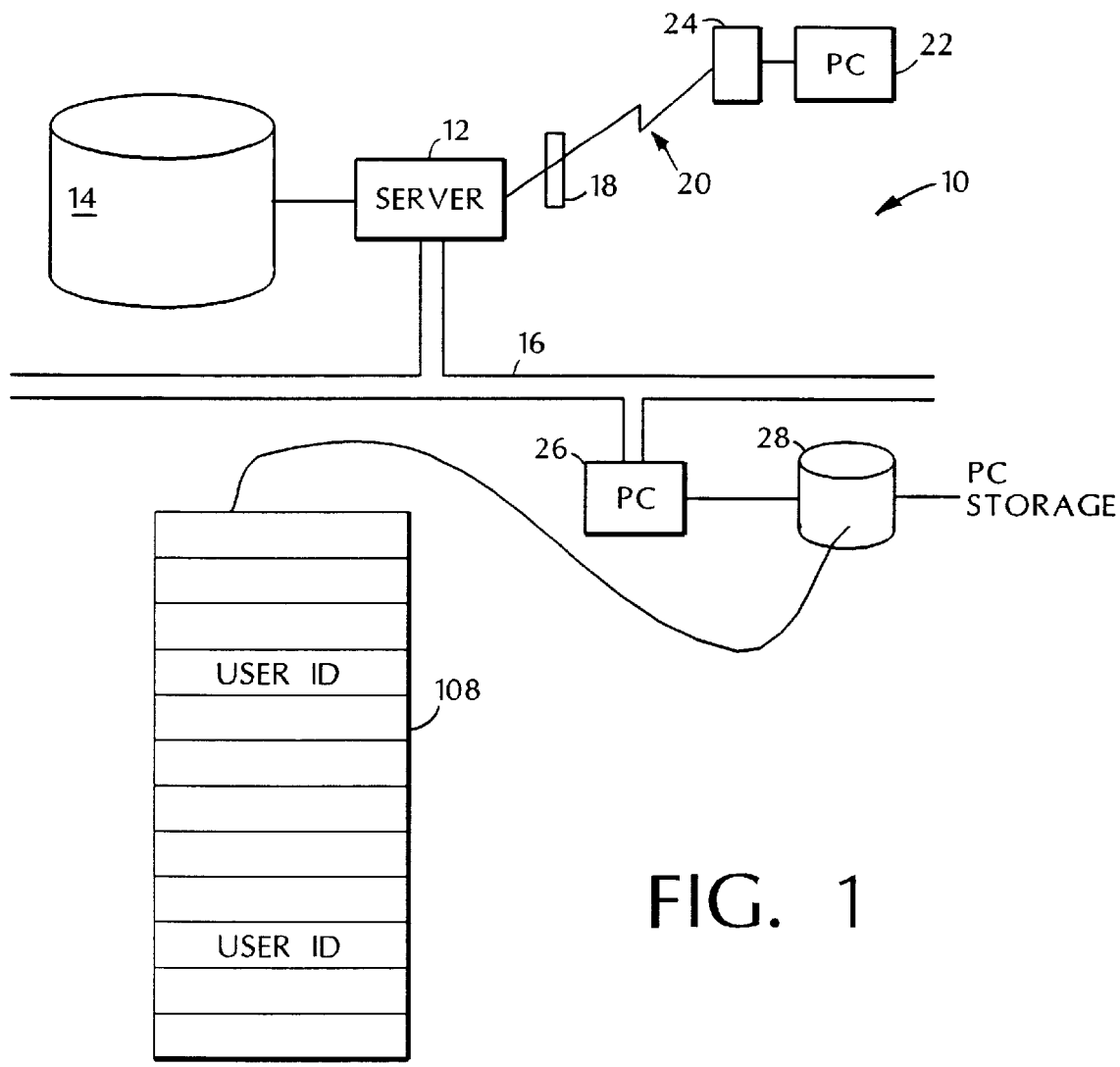
FIG. 1 is a block diagram of a networked computer system if which the invention is used.
FIG. 2 is a typical table identifying the user, his personal code, and his encryption code.

Referring to FIG. 1, a system 10 in which the invention is most useful, includes a server 12 having a disk memory 14 and connected to a network 16 which can be either an internal network, such as an Ethernet or token ring network, or the Internet. Server 12 also has modem connections 18 to connect through a telephone or satellite communications system 20 to, or from, a PC system 22 also connected through a modem 24.

Connecting to the network can be a plurality of PCs 26 each having a disk storage element 28. In this manner, the server can provide programs or data, stored in memory 14, upon request, to the PCs 22 or 26 and can receive data and requests from the PCs 22 and 26.

In order to guarantee use of the programs stored by the server in disk memory 14 to properly authorized personnel, typically, for example, company employees, and to ensure that it can only be used by its assigned user(s), the software itself is fingerprinted and/or branded. The method of the invention should also, if the software is stolen or copied, render it unusable other than by its correct company owner, and in addition, the server 12 preferably logs the caller on the remote computer to identify and track the path of the software.

The delivery system uses a file server program which runs over the network, or Internet, at the server 12. This program delivers executable programs to users provided they can properly identify themselves by name and password. Once identified, the delivery system will transmit the requested software, encrypted with an encryption key of the user's choice, and at the same time brand or embed the encrypted software with an identification of the user. Thus, referring to FIG. 2, associated with each user in column 30 is a first user code word in column 32 and an encryption key as indicated in column 34.

Since the server will encode the program stored in memory 14 in accordance with an encryption key (column 34), before delivering it to the user, the delivered program is in a format which is not executable by any operating system. However, when the user desires to use the program, in accordance with this embodiment of the invention, the user defines the encryption key that was used to encrypt the program in the software system, and the software is then decrypted and loaded on the fly into computer memory and run. At no time is the executable program code ever written to the system's nonvolatile memory, such as disk.

Figure 3:
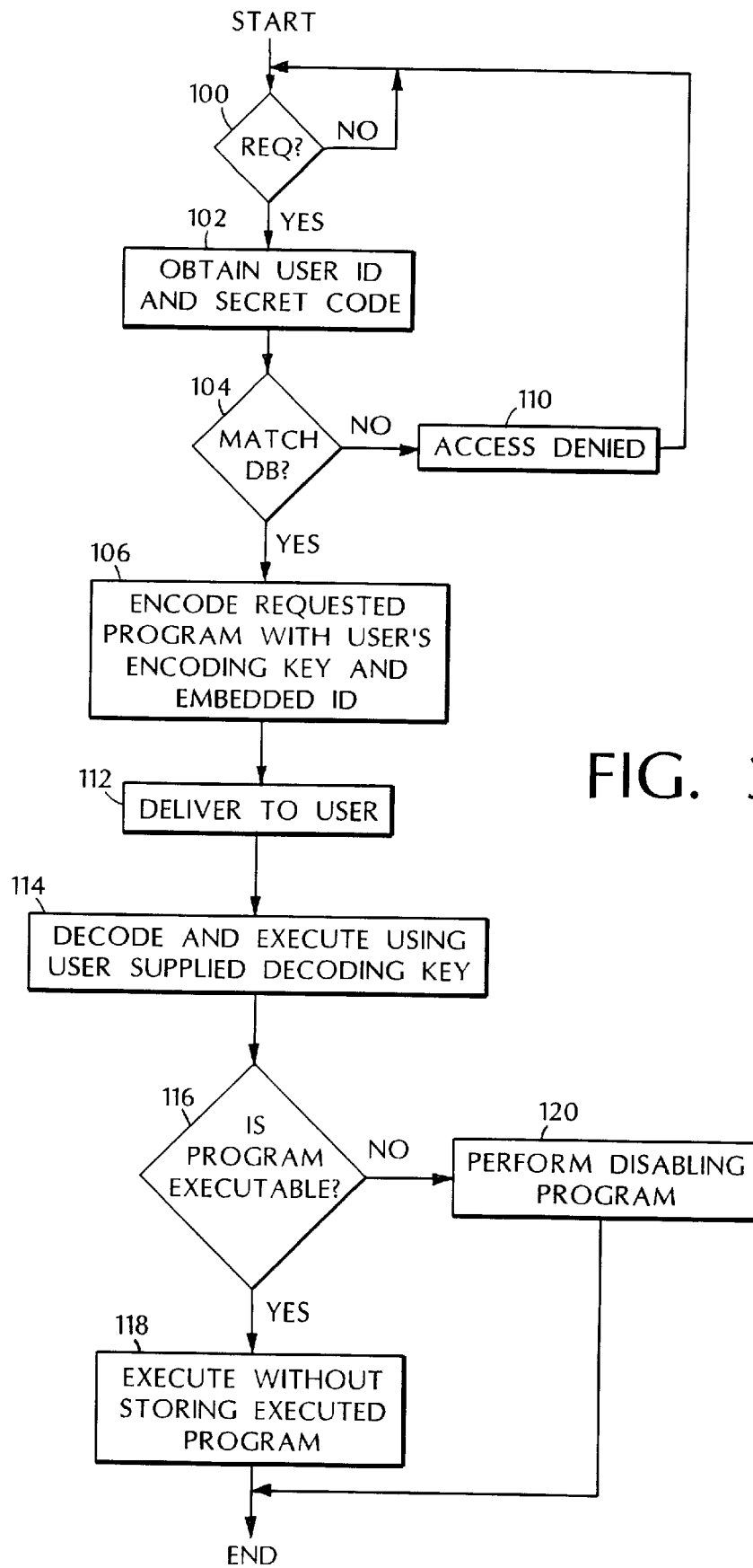
FIG. 3 is a flow chart detailing the steps used in connection with the method and apparatus of the invention.

Accordingly, in operation of the system of FIG. 1, and referring to FIG. 3, the server awaits a request at 100 and, until a request is received, stays in that state. When a request is received, the server obtains the user ID and secret code (columns 30 and 32 of FIG. 2) as indicated at 102 and, if the name and code received from the user match the name and secret code in the database, as indicated at 104, the program running on the server encodes the requested program using the user's encryption key (column 34). This is indicated at 106. In addition to using the user's encryption key, and in order to better track and identify a software program, should the delivered program fall into unauthorized hands, the program running on server 12 further embeds in the program, preferably at two or more locations, an identification of the user. This is provided in a form which, according to one preferred embodiment of the invention, is easier to identify in one embedded identification data and much harder to identify in a second embedded identification data. More than two identifications data can be embedded in the program. This is illustrated in the delivered program identified at 108 in FIG. 1

If the information provided by the user does not match the database information, access is denied at 110 and depending upon the particular system, the system can, for example, simply revert back to waiting for further requests at 100. After the program has been encoded, it is delivered to the user at 112 in a format in which the encoded program is not executable. Delivery can occur over the telephone communications network 20 through modems 18 and 24, over the Internet or Intranet network 16, or other some other appropriate delivery method including, for example, a transfer by floppy disk. At the user's site, after delivery, the program is decoded and executed using the user supplied decoding key. This is indicated at 114. If the user provides the correct decoding key, then the program can be properly decrypted at 114 and the resulting program is executable at 116 and is executed without storing an executable copy of the program in nonvolatile memory such as hard disk, at 118. If the program however is not executable, meaning that the wrong encryption key was provided, the program is designed to perform a disabling routine as indicated at 120. This has the advantageous effect of being time consuming, which discourages random attacks at the encryption key. Various disabling methods can be used, for example the destruction of all or part of the encrypted program, or modules thereof, or forcing the user to reboot the machine each time an incorrect encryption key is provided at 114. Both methods can also be used, and then, each time the incorrect encryption key is provided, the user must reboot and request the program again from the server 12.

This has the effect of discouraging unauthorized users, who obtain access to the program, from trying to further use or decrypt the program. That is, such unauthorized users must be aware that the program can self-destruct, and further, they must be aware that they cannot obtain a further copy of the program unless they have the legal name and secret code necessary to obtain delivery of the program from the server.

Figure 4:
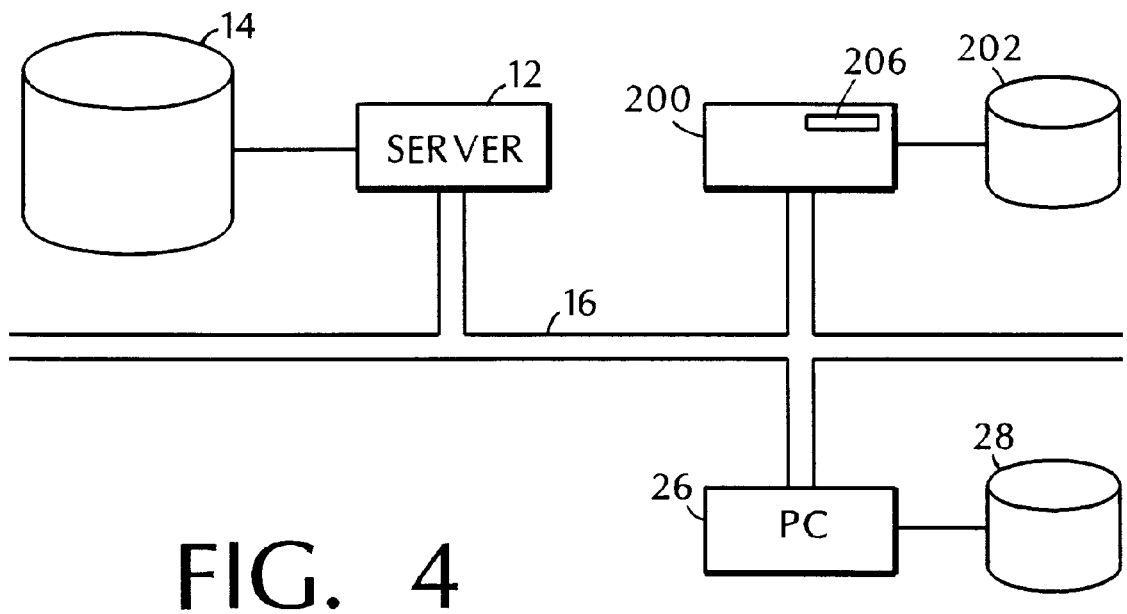
FIG. 4 is a block diagram of an alternative embodiment of the invention.

In other embodiments of the invention, referring to FIG. 4, the server 12 and its hard drive file storage 14 are again connected to a network 16. Also, the PC user 26 and its hard drive storage 28 are connected to the network 16. Here however the program to be accessed is accessed through a separate computer 200 having a hard disk storage 202 which stores the program to be delivered. In accordance with this embodiment of the invention, a method for tracking users is provided which is also useful in the embodiment of FIG. 1. It is known that situations exist where an authorized user wants to obtain a program to which he does not have authorization but does not want to leave a trail that he has in fact downloaded the program from memory. In order to combat this clandestine operation, a PC 200 can store in a nonvolatile memory 206 within the PC, typically CMOS, and/or on the hard drive in a camouflaged location, a record of the last user to access the PC or a list of last users accessing the PC. When stored on a disk 202, the list can be embedded in a program which is ordinarily run on the PC, so as to not be obvious from a surface examination of the programs stored on disk 202.

Figure 5:
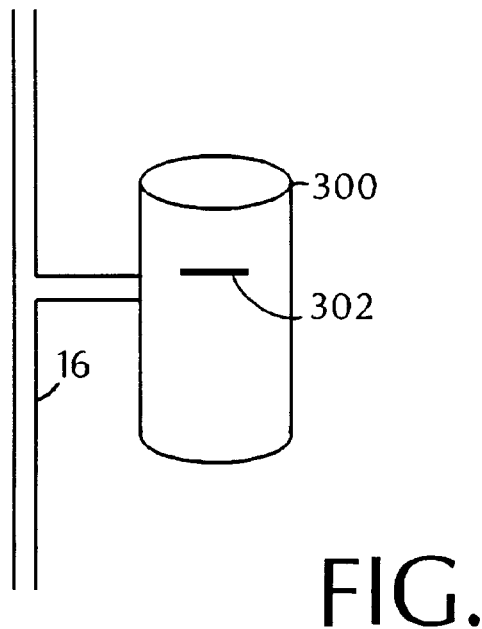
FIG. 5 is a block diagram of a particular system structure in accordance with the invention.

Referring now to FIG. 5, there often occurs a time when a program stored in memory is available to many different users. Should one of those users, even a legitimate user, desire to download the program onto a floppy disk and use it elsewhere, there may be very little to prevent him from doing so if he is authorized to use the program and has the correct codes. However, in accordance with the invention, a further variation of the encryption program can be used to effectively block the use of a copy, obtained either directly or from the network, on a separate and different PC. In accordance with this aspect of the invention, a disk drive 300 stores at a given location, a program 302. As described above, the program is encrypted preferably using an encryption key but with the variation that a non-visible key is also embedded in the key to be used. This is the preferred embodiment of this aspect of the invention, the encryption of the program, transparently to any user, makes use of the location at which the program is stored in disk drive 300. Thus, the program when loaded into disk drive 300 is known in advance to be placed at a specific address, and that address is used, with or without the user encryption key, to encode the program in the manner identified above. Thereafter, when a user desires to use the program, decoding occurs exactly as outlined above except that the decoding key is derived, at least in part, from the address at which the program exists on disk drive 300; and accordingly, if a copy is made of the program and taken to another machine, it is most unlikely that the program will be stored at the identical address in the new system. Accordingly, when the program is called for execution, even if an authorized user provides a legitimate encryption key, the program will not decrypt correctly because the address at which it is stored on disk drive is not the same address as that at which it had been stored on the original disk drive 300 and thus, the program will either self-destruct, disable the system, or operate in another disable function mode in accordance with the decryption and execute program. Accordingly, even legitimate users would not be able to take copies of the program stored in memory and use them on other systems for any purposes.

This last procedure of course requires that the encryption program know in advance where the encrypted program will be stored. This can be accomplished with ease using the server and destination operating systems.

Additions, subtractions, and other modifications of the described particular embodiments of the invention will be apparent to those of ordinary skill in the art and are within the scope of the following claims.

What is claimed is:

1. A method of controlling the distribution of computer software products stored at a file server to target computers comprising the steps of
    requesting the identity of a user and the user's first secret key to enable access to requested program product,
    encoding the requested program product, if the user identity and the secret key match corresponding entries in a file server, using a second key known to the user, and
    embedding in said encoded program an identification of said user.

2. The method of claim 1 further comprising the steps of storing at said file server, written in a camouflaged manner in a program on a disk memory, an identification of the user accessing said requesting program.

3. The method of claim 2 further comprising the step of storing in non-volatile, non-disk memory, at the file server, an identification of the user accessing said requested program.

4. The method of claim 1 wherein said embedding step further comprises the step of
    embedding at least two identifications of said user in said encoded program, at least one identification being difficult to find and at least one identification being easy to find.

5. The method of claim 4 further comprising the steps of
    encoding the requested program with a CRC for determining whether any of the embedded user identifications has been changed after encoding, and
    disabling at least portions of the encoded program when a CRC check calculation fails during program execution.

6. The method of claim 1 further comprising the steps of
    decoding said program upon receipt of the second key from the user, and
    executing said decoded program.

7. The method of claim 6 wherein said decoding and executing steps operate without storing a copy of said decoded program in non-volatile memory.

8. The method claim 1 further comprising the steps of
    decoding said program using a decoding key provided by a user, and
    executing said decoded program in a normal operating fashion when said decoding key corresponds to the second key, and in a program destruct fashion when said decoding key does not correspond to said second key.

9. The method of claim 8 wherein said executing step, operating in a program destruct fashion, comprises the step of
    rendering at least portions of said encoded program unexecutable.

10. The method of claim 8 wherein said executing step, operating in said program destruct fashion, comprises the step of
    disabling the computer system attempting to execute said program, thereby requiring said system to at least be rebooted.

11. The method of claim 1 wherein said encoding step is further dependent upon a third key derived from the address on hard disk at which the encoded program is stored.

12. A method of controlling the distribution of computer software products stored at a file server and delivered upon a request from a user over a network to a target client comprising the steps of
    receiving from a user a request to deliver a computer program over said network,
    requesting the identity of said user and the user's secret key before enabling access to the requested computer program
    verifying the identity of the user, using the user's secret key,
    encoding the requested program using at least an encoding key known to the user,
    embedding in the encoded program at least one identification of the user, and
    delivering the encoded program over the network to the user.

13. Apparatus for controlling the distribution of computer software products stored at a file server to target computers comprising
    means for requesting the identity of a user and the user's first secret key to enable access to requested program product, means for encoding the requested program product, if the user identity and the secret key match corresponding entries in a file server using a second key known to the user, and means for embedding in said encoded program an identification of said user.

14. The apparatus of claim 13 further comprising means for storing at said file server, written in a camouflaged program on a disk memory, an identification of the user accessing said requesting program.

15. The apparatus of claim 14 further comprising means for storing in non-volatile, non-disk memory, at the file server, an identification of the user accessing said requested program.

16. The apparatus of claim 13 wherein said embedding means further comprises means for embedding at least two identifications of said user in said encoded program, at least one identification being difficult to find and at least one identification being easy to find.

17. The apparatus of claim 16 further comprising means for encoding the requested program with a CRC for determining whether any of the embedded user identifications has been changed after encoding, and means for disabling at least portions of the encoded program when a CRC check calculation fails during program execution.

18. The apparatus of claim 13 further comprising means for decoding said program upon receipt of the second key from the user, and executing said decoded program.

19. The apparatus of claim 18 wherein said decoding and executing means operate without storing a copy of said decoded program in non-volatile memory.

20. The apparatus of claim 13 further comprising means for decoding said program using a decoding key provided by a user, and means for executing said decoded program in a normal operating fashion when said decoding key corresponds to the second key, and in a program destruct fashion when said decoding key does not correspond to said second key.

21. The apparatus of claim 20 wherein said executing means, operating in a program destruct fashion, comprises means for rendering at least portions of said encoded program unexecutable.

22. The apparatus of claim 20 wherein said executing means, operating in said program destruct fashion, comprises means for disabling the computer system attempting to execute said program, thereby requiring said system to at least be rebooted.

23. The apparatus of claim 13 wherein said encoding means is further dependent upon a third key derived from the address on hard disk at which the encoded program is stored.

24. Apparatus for controlling the distribution of computer software products stored at a file server and delivered upon a request from a user over a network to a target client comprising means for receiving from a user a request to deliver a computer program over said network, means for requesting the identity of said user and the user's secret key before enabling access to the requested computer program means for verifying the identity of the user, using the user's secret key, means for encoding the requested program using at least an encoding key known to the user, means for embedding in the encoded program at least one identification of the user, and means for delivering the encoded program over the network to the user.

* * * * *